US012736941B2

(12) United States Patent
Schneider et al.

(10) Patent No.: US 12,736,941 B2
(45) Date of Patent: Sep. 15, 2026

(54) DYNAMIC SERVICE INTERVAL SCHEDULING FOR MACHINE

(71) Applicant: Caterpillar Inc., Peoria, IL (US)

(72) Inventors: Karl P. Schneider, Decatur, IL (US); Andrew Olson, Vail, AZ (US)

(73) Assignee: Caterpillar Inc., Peoria, IL (US)

( * ) Notice: Subject to any disclaimer, the term of this patent is extended or adjusted under 35 U.S.C. 154(b) by 330 days.

(21) Appl. No.: 18/205,202

(22) Filed: Jun. 2, 2023

(65) Prior Publication Data

US 2024/0404326 A1 Dec. 5, 2024

Related U.S. Application Data

(63) Continuation of application No. 18/205,072, filed on Jun. 2, 2023.

(51) Int. Cl.

| | |
|---|---|
| ***G05D 1/00*** | (2024.01) |
| ***G05B 19/406*** | (2006.01) |
| ***G07C 5/00*** | (2006.01) |
| ***G07C 5/08*** | (2006.01) |

(52) U.S. Cl.

CPC ........... *G05B 19/406* (2013.01); *G07C 5/006* (2013.01); *G07C 5/0841* (2013.01); *G05B 2219/50206* (2013.01)

(58) Field of Classification Search

CPC .................................................... G05B 19/406

See application file for complete search history.

(56) References Cited

U.S. PATENT DOCUMENTS

| | | | | |
|---|---|---|---|---|
| 9,018,913 B2 | 4/2015 | Middleton et al. | | |
| 9,697,652 B2 | 7/2017 | Lennevi et al. | | |
| 10,672,199 B2 | 6/2020 | Landolsi et al. | | |
| 2012/0296512 A1* | 11/2012 | Lee | ....................... | H01M 10/48 701/29.3 |
| 2015/0337522 A1 | 11/2015 | Diekevers et al. | | |
| 2017/0175516 A1* | 6/2017 | Eslinger | .................. | E21B 43/12 |
| 2018/0188332 A1* | 7/2018 | Newman | ................ | B60K 35/10 |

(Continued)

FOREIGN PATENT DOCUMENTS

| | | | |
|---|---|---|---|
| WO | WO-2022059033 A1 * | 3/2022 | ..... G06Q 10/063114 |
| WO | 2022263056 A1 | 12/2022 | |

OTHER PUBLICATIONS

Written Opinion and International Search Report for Int'l. Patent Appln. No. PCT/US2024/029619, mailed Sep. 5, 2024 (12 pgs).

*Primary Examiner* — Ramon A. Mercado
*Assistant Examiner* — Paul W Arellano

(57) ABSTRACT

Dynamic service interval scheduling in a machine includes receiving monitoring signals for a plurality of components in the machine each indicative of an operating characteristic upon which a state-of-health (SOH) of one of the plurality of components is dependent. An SOH term is calculated for each one of the components based on the monitoring signals and a stored SOH degradation progression profile. SOH reporting signals are outputted based on a respective one of the SOH terms. The reporting signals may indicate a plurality of different continued service capacities among the components at least some of which are runtime-independent of one or more components in a drive system in the machine. Related apparatus and control logic is also disclosed.

17 Claims, 5 Drawing Sheets

(56) References Cited

U.S. PATENT DOCUMENTS

| | | | |
|---|---|---|---|
| 2018/0202398 | A1 | 7/2018 | Jammoussi et al. |
| 2020/0007011 | A1 | 1/2020 | Doglio |
| 2020/0130866 | A1* | 4/2020 | Srinivasan ......... G05B 23/0235 |
| 2020/0284204 | A1 | 9/2020 | Cafaro et al. |
| 2021/0125420 | A1* | 4/2021 | Tabata .................. G07C 5/006 |
| 2021/0175835 | A1 | 6/2021 | Zhang |
| 2021/0356926 | A1 | 11/2021 | Singh et al. |
| 2021/0394867 | A1* | 12/2021 | Montague ............ B63H 21/213 |
| 2023/0229155 | A1 | 7/2023 | Naziri |
| 2024/0169771 | A1 | 5/2024 | Zhang et al. |

* cited by examiner

DYNAMIC SERVICE INTERVAL SCHEDULING FOR MACHINE

CROSS-REFERENCE TO RELATED APPLICATIONS

The present disclosure is a continuation of U.S. patent application Ser. No. 18/205,072, filed Jun. 2, 2023, the entire disclosure of which is incorporated herein by reference.

TECHNICAL FIELD

The present disclosure relates generally to monitoring states of health of components in a machine, and more particularly to dynamic service interval scheduling based on varied states of health among components in a machine.

BACKGROUND

Most types of modern machinery include serviceable and/or consumable components. Replacement of components including filters, seals, friction components such as brake pads and clutch discs, as well as routinely scheduled servicing of various fluid systems by way of flushing, cleaning, and fluid changes will be familiar to most. In some machines, particularly heavy-duty equipment used in off-highway environments such as mining, construction, forestry, waste, and others, larger and more complex components may need servicing or replacement over time, including the engine or other parts of the powertrain, electric motors, inverters, pumps, the machine frame, and various others. Over the course of time virtually all of the individual parts of a machine may be replaced. It has long been standard practice to perform component replacement and system servicing according to a predetermined schedule based on vehicle mileage, logged operating hours, or calendared service intervals.

Certain types of machinery, especially machines used in the highly variable and/or harsh off-highway environments as noted above, can utilize components having a service life that varies depending upon how the machine is used. For example, off-highway trucks can operate in environments and in operating cycles that vary widely with respect to altitude, ambient temperatures, loading practices, underfoot conditions, grade, haul length, and many others. These conditions can change day to day or seasonally and have widely ranging effects on the rates of wear or cumulative damage to various components in the machine.

As a result, engineers have developed various ways to measure, model, and prognosticate the extent to which individual machine components can continue to operate successfully in the field. In many instances, variable rates by which the "health" of different components degrades can create challenges to optimally scheduling servicing. It can be inconvenient and uneconomical to service a machine relatively more frequently in an effort to avoid any one component degrading in health past an intended state. In many instances, productive time lost for a unique service is a much larger economic loss than the performance of the service work itself. On the other hand, performance can suffer or failure even be risked if a component is kept in service too long. The relative impacts of the state of health of any one component on overall machine performance can also be highly variable.

Recent advancements in machine technology, and in particular in certain propulsion systems, have exacerbated these challenges. Even where the state of health of an individual component or system can be theoretically quantified, the progression of degradation to the states of health among different components can vary widely and unpredictably throughout a machine. One known strategy for real time health monitoring of an individual machine component is known from United States Patent Application Publication 2021/0356926A1 to Kumar et al.

SUMMARY OF THE INVENTION

In one aspect, a method for dynamic service interval scheduling in an electric-drive machine includes receiving a plurality of monitoring signals, for a plurality of components in an electric-drive machine, and each being indicative of an operating characteristic upon which a state-of-health (SOH) of a respective one of the plurality of components is dependent. The method further includes calculating an SOH term for each one of the plurality of components based on the plurality of monitoring signals and a plurality of stored SOH degradation progression profiles for each respective one of the plurality of components. The method still further includes outputting a plurality of SOH reporting signals each based on a respective one of the SOH terms and being indicative of a plurality of different continued service capacities among the plurality of components.

In another aspect, an electric-drive machine includes a frame, ground-engaging elements coupled to the frame, and a plurality of components including an electric traction motor coupled to at least one of the ground-engaging elements, and an electric power device. The electric-drive machine further includes a service interval scheduling system having a plurality of sensors, and a system controller. The system controller is structured to receive, at least in part from one or more of the plurality of sensors, a plurality of monitoring signals each being indicative of an operating characteristic upon which a state-of-health (SOH) of a respective one of the plurality of components is dependent. The system controller is further structured to calculate an SOH term for each one of the plurality of components based on the plurality of monitoring signals and a plurality of stored SOH degradation progression profiles for each respective one of the plurality of components. The system controller is further structured to output a plurality of SOH reporting signals each based on a respective one of the SOH terms and being indicative of a plurality of different continued service capacities among the plurality of components.

In still another aspect, a system for service interval scheduling in an electric-drive machine includes a system controller structured to receive via a state-of-health (SOH) monitoring module a plurality of monitoring signals each being indicative of an operating characteristic upon which an SOH of a respective one of a plurality of components in an electric-drive machine is dependent. The system controller is further structured to calculate an SOH term for each one of the plurality of components based on the plurality of monitoring signals and a plurality of stored SOH degradation progression profiles for each respective one of the plurality of components. The system controller is further structured to output to a service interval scheduling module a plurality of SOH reporting signals each based on a respective one of the SOH terms and being indicative of a plurality of different continued service capacities among the plurality of components.

DETAILED DESCRIPTION

Figure 1:
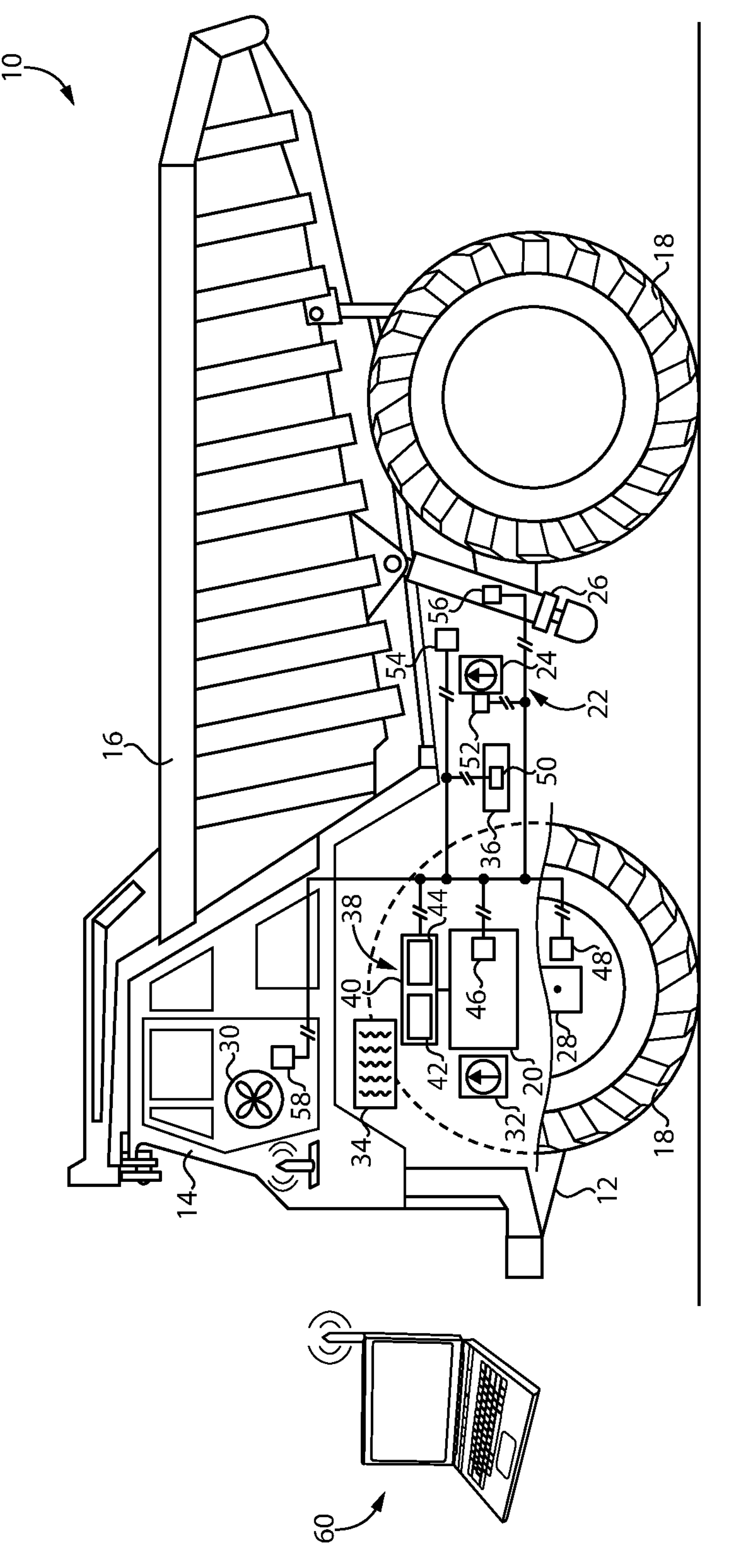
FIG. 1 is a diagrammatic view of an electric-drive machine, according to one embodiment.

Referring to FIG. 1, there is shown an electric-drive machine 10 including a frame 12, a cab 14 supported upon frame 12, and a plurality of ground-engaging propulsion elements 18 coupled to frame 12. A dump bed 16 configured for raising and lowering is also supported upon frame 12. Machine 10 is shown in the context of an off-highway truck where ground-engaging propulsion elements 18 include wheels. In other example applications, an electric-drive machine according to the present disclosure might include a track-type machine such as a track-type tractor, a wheel loader, a scraper, a motor grader, an excavator, a paver, a compactor, or any of a variety of other off-highway or on-highway machines. Still other implementations may apply to the above listed machine types and still others having various non-electric powertrains such as a combustion engine coupled to a mechanical drivetrain, or various hybrid systems, as further discussed herein.

Machine 10 also includes an electric-drive system 20, features and functionality of which are further discussed herein. It should be appreciated that description and discussion of an electric-drive system is understood to apply by way of analogy to non-electric and/or hybrid drive systems contemplated herein except where otherwise indicated or apparent from the context. Machine 10 may also include a hydraulic system 22 having a hydraulic pump 24 and one or more hydraulic actuators 26. In the illustrated embodiment the one or more hydraulic actuators 26 can be used to tilt dump bed 16 for dumping a load of material such as rock, soil, sand, ore, etc. In other embodiments an implement system in a machine might include a hydraulically-actuated blade or bucket, or a variety of boom-mounted hydraulically or pneumatically-actuated implements such as shears, a saw, a hammer, or still other work tools. Machine 10 is not limited with regard to machine type or implement type(s), service application, or work environment.

Machine 10 also includes a plurality of components, including components of electric-drive system 20, some or all of which can be electrically operated. Machine 10 includes one or more brakes 28, in the illustrated embodiment a friction brake used to apply a braking force to one of ground-engaging elements 18. Machine 10 may also include a fan 30 illustrated as a fan in cab 14. Other fans for a range of purposes might also be part of machine 10. A coolant pump 32 is further provided and may pump a coolant or a refrigerant for use in cooling components of electric-drive system 20. Also shown is a resistor grid 34 that can be used to dissipate excess electric power in appropriate instances. Machine 10 further includes a driveline 36 having components such as one or more shafts, gears, a transmission, a clutch, bearings, and potentially still others. Frame 12 is also understood as one or more components as that term is contemplated herein.

A "component" in the context of the present disclosure may include any structure or device in a machine that is the target of servicing including but not limited to replacement, maintenance such as lubrication or adjustment, or the target of monitoring for damage, performance degradation, or failure. It will therefore be appreciated that the example components listed herein are for illustrative purposes only and the present disclosure is not limited with regard to type, number, arrangement, or function of components. As will be further apparent from the following description machine 10 is uniquely configured by way of a service interval scheduling system 38 to monitor, evaluate, and act upon a varying state-of-heath (SOH) among a plurality of different components.

The SOH of a component as contemplated herein includes any quantitative or qualitative measure indicative of a capacity for continued service (a "continued service capacity") of a component based at least in part, for example, on factors such as time duration or operating cycles logged since being placed in service, time duration or operating cycles remaining before expected performance degradation or failure, cumulative damage, qualitative designations such as "new," "old," "clean," "dirty," percent lifetime elapsed or remaining, or still others. In some instances, an SOH could be expressed as a number from 0 to 1 or as a percentage, with an SOH-0 or 100% representing an SOH expected when a component is first placed in service, and an SOH=1 or 0% representing an SOH where replacement or other servicing is required.

Service interval scheduling system 38 (hereinafter "system 38") includes a system controller 40. System controller 40 may include one or more processors 42 and one or more computer readable memories 44. A processor as contemplated herein may include a microprocessor, a microcontroller, or another suitable computerized device having a central processing unit (CPU). System controller 40 could include one processor performing the logic functions of the present disclosure, or multiple processors housed together or separately onboard machine 10, or even distributed to different locations including one or more onboard processors and one or more offboard processors.

A computer readable memory as contemplated herein might include RAM, ROM, a hard-drive, flash, DRAM, SDRAM, EEPROM or any other suitable type of volatile or non-volatile memory. The one or more computer readable memories 44 store program control instructions executed on system controller 40 to perform the logic functions of the present disclosure. Various maps or other data structures may also be stored on the one or more memories 44. System 38 may also include or be coupled in communication to an offboard computer 60, such as a service tool or supervisory computer in a computer station at a fixed location at a work site.

System 38 may also include a plurality of sensors onboard machine 10. In the illustrated embodiment, system 38 includes a motor sensor 46 structured to monitor, for example, an operating characteristic such as a temperature associated with electric-drive system 20. System 38 may also include a brake sensor 48 structured to monitor an operating characteristic associated with brake 28 such as a temperature, brake pad thickness or state. System 38 may also include a driveline sensor 50 structured to monitor an operating characteristic of driveline 36 such as torsional loading as further discussed herein. A hydraulic pump sensor 52 may be provided to monitor a pressure, a temperature, or still another operating characteristic associated with hydraulic pump 24. System 38 may also include a frame sensor 54 structed to monitor an operating characteristic associated with frame 12 such as a stress characteristic or a strain characteristic. An actuator sensor 56 may be provided for monitoring an operating characteristic associated with hydraulic actuator 26, and a fan sensor 58 might be provided for monitoring an operating characteristic associated with fan 30. Still other sensors might include sensors for voltage, current, or resistance, for example, in electrical components of machine 10.

Each of the sensors of system 38 contemplated herein can include any suitable known sensor including a capacitive sensor, a resistance sensor, an inductance sensor, a pressure sensor, a temperature sensor, a strain gauge, a camera, a switch, or still another sensor that is capable of producing data directly or indirectly indicative of a monitored operating characteristic of interest of a respective one of the plurality of components of machine 10. Monitoring signals associated with operating characteristics of the respective components may include electrical sensor signals encoding data output by the individual sensors, or derived by interrogation of the sensors, as well as derived from control commands produced by system controller 40 or another electronic control unit, or determined using onboard physics-based models or offboard characterizations. For example, a monitoring signal indicative of a cycle number operating characteristic of a pump could be based on a number of times the pump is commanded by a control unit to operate rather than directly sensing each time a pump actually turns on or off.

Figure 2:
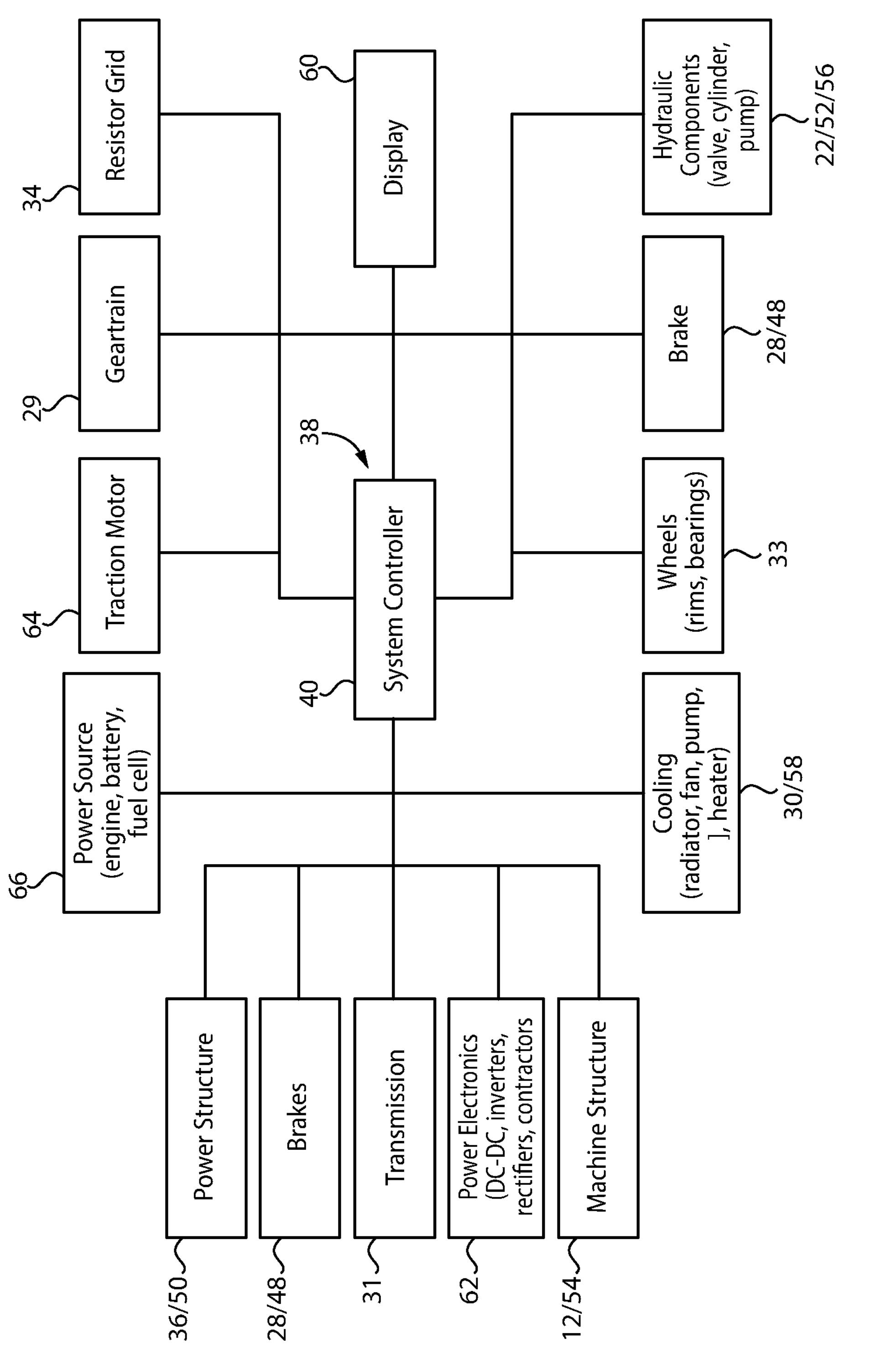
FIG. 2 is a block diagram of components and communications in an electric-drive machine as in FIG. 1.

Referring now also to FIG. 2, system controller 40 may be in communication with various of the components of machine 10. In the illustrated embodiment power electronics 62 of electric-drive system 20 are coupled between system controller 40 and each of an electric traction motor 64, an electric power device 66 and resistor grid 34. Power electronics 62 may include suitable inverters, rectifiers, transformers, switches, or other electrical components suitable for providing electric power to electric traction motor 64 from electric power device 66 or from other sources. Power electronics 62 and/or components of power electronics 62 may be considered a component in the present context.

In an implementation, electric power device 66 includes a battery. Additionally, or alternatively, machine 10 might include a fuel cell such as a solid oxide fuel cell or a proton exchange membrane fuel cell, an electric generator, a capacitor, or another electric power device. Machine 10 may be equipped with a variety of energy storage devices, including a battery or capacitor as noted above but also potentially including a high-speed fly wheel, a hydraulic accumulator, or still others. In a non-electric drive machine or various types of hybrid machines, a drive system might include a power device such as an internal combustion engine, a transmission that is mechanical, hydraulic, or hybrid hydro-mechanical, a differential, axles, universal joints and/or other equipment.

System controller 40 may also be coupled to other components listed above as well as associated sensors. As can be seen from FIG. 2, system controller 40 may be coupled to brake 28 and sensor 48, to hydraulic system 22 including sensors 52 and 56, to machine structure (frame 12) and sensor 54, to driveline structure 36 and sensor 50. System controller 40 may also be coupled to various peripheral devices including but not limited to fan 30 and sensor 58.

System controller 40 may be also coupled, such as by way of a wired or wireless communication link, to service computer 60. Service computer 60 may include a display as reflected in FIG. 2 and further discussed herein. It should be appreciated that the architecture depicted in FIG. 2 is exemplary only, and in different machine configurations or employing different component populations the specific arrangement or communication strategy employed might differ considerably. In an embodiment, monitoring data of the various components might be uploaded offboard to a cloud type system for online remote viewing.

As discussed above, each of the plurality of sensors in system 38 monitors an operating characteristic of at least one of a plurality of different components. System 38, and in particular system controller 40, is structured to receive, at least in part from one or more of the plurality of sensors, a plurality of monitoring signals. Each of the plurality of monitoring signals may be indicative of an operating characteristic upon which an SOH of a respective one of the plurality of components is dependent.

By way of example, and as suggested above an SOH of a given component might be defined by or based on a number and/or severity of operating cycles such as turning on or turning off, rotating, extending, retracting, etc., that have been performed relative to a total number and/or severity of expected or permitted operating cycles in the course of that component's service life or between service intervals. Thus, in a simple example, a pump might be assigned to perform a thousand cycles between service intervals, and thus an SOH of that pump could be defined as a number of cycles performed divided by 1000. As will be further discussed herein, many components may have an SOH defined in accordance with a number of different and potentially cross-coupled operating characteristics. Continuing with the example of a pump, the SOH might be defined in part on the basis of a number of cycles executed, but also in part on the basis of a duty cycle of the pump, an age of the pump, a temperature, temperature range, or peak temperature, of the working fluid, a pressure, pressure range, or peak pressure, of the working fluid, and potentially various other factors. The SOH of any given component is typically understood to be indicative of cumulative damage or degradation.

System controller 40 may be further structured to calculate an SOH term for each one of the plurality of components based on the plurality of monitoring signals and a plurality of stored SOH degradation progression profiles for each respective one of the plurality of components. The SOH term might be calculated on the basis of short or long term trends as it relates to predicting time to end of life. Thus, memory 44 may store a different SOH degradation progression profile for each individual component, and an SOH term, such as a numerical term as noted herein, calculated on the basis of the monitored operating characteristic and the corresponding stored SOH degradation progression profile. Each stored SOH degradation progression profile may include at least one of a stored model, a stored equation, a limit, a threshold, or another reference or standard that can enable a present and/or historical state or value of an operating characteristic upon which the SOH of a given component is dependent to be used to calculate an SOH term, as further discussed herein.

System controller 40 may be further structured to output a plurality of SOH reporting signals each based on a respective one of the SOH terms and being indicative of a plurality of different continued service capacities among the plurality of components. Each continued service capacity may be one of time-based, cycle number-based, wear-based, or consumption-based such as for a consumable component like a filter.

Figure 3:
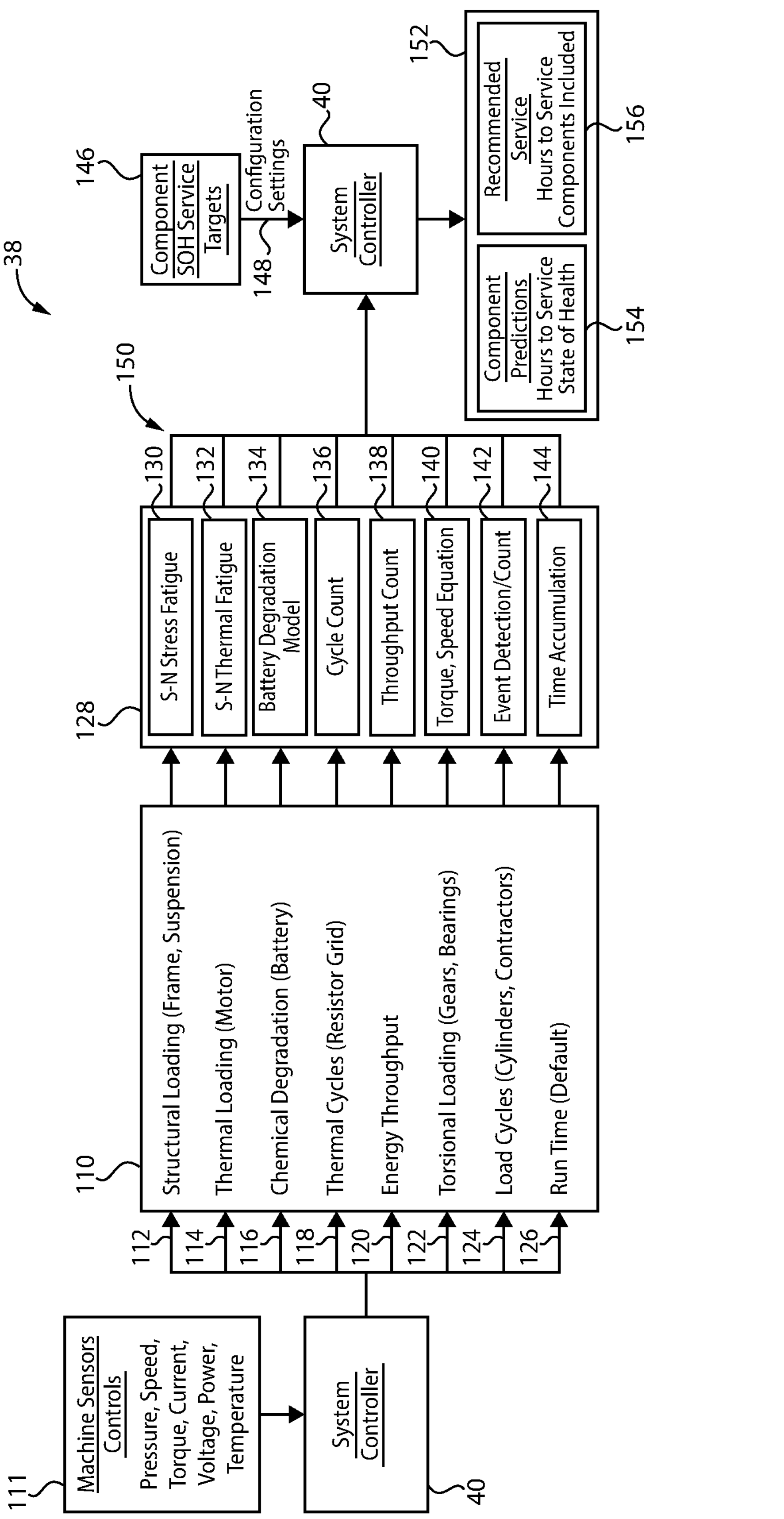
FIG. 3 is a functional block diagram illustrating example operations and a control and monitoring configuration in a service interval scheduling system, according to one embodiment.

Referring also now to FIG. 3, there is shown a functional diagram of system 38 illustrating additional details. In an implementation, system controller 40 may execute software arranged generally in an SOH monitoring module 110, a calculation module 128, and a service interval scheduling module 152. As depicted in FIG. 3, a block 111 represents the various physical machine sensors and virtual estimates using machines sensors, for example an estimate of motor torque from current, and controls including sensor data sources and controls data sources indicating operating characteristics such as pressure, speed, torque, electrical current, voltage, electric power, temperature. The various data sources produce a plurality of monitoring signals as discussed herein that are received via SOH monitoring module 110.

In the illustrated embodiment, a first monitoring signal 112 includes a structural loading signal such as a strain gauge signal for frame 12 indicative of a structural loading operating characteristic. Other structural loading signals could be associated with other structural components of machine 10 such, such as shocks, struts, or other suspension equipment. Other loading of components could be estimated or observed using inertial sensors, measured acceleration and/or estimated machine mass with payload. A monitoring signal 114 includes a thermal loading signal associated, for example, with a thermal loading operating characteristic of electric traction motor 64. The thermal loading signal might include a present temperature, temperature history, a maximum or a minimum temperature in a sampling period, or still another. A monitoring signal 116 includes a chemical degradation signal indicative of a chemical degradation operating characteristic of electric power device 66. The chemical degradation signal could include a signal indicative of a reactant amount, a reactant state, a reactant composition, a battery electrical property, or still other parameters, such as temperature, state of charge, current, voltage, charging cycle number, or state of charge range to name a few examples. A monitoring signal 118 includes a thermal cycles signal indicative, for example, of a number, severity, or severity range of thermal cycles operating characteristic of resistor grid 34. A monitoring signal 120 includes an energy throughput signal indicative of an energy throughput operating characteristic of brake 28. Energy throughput may be indicative of wear. Machine brake temperature and application pressure measurements in conjunction with a physics-based model or characterization may be used to estimate component temperature, strain, and/or damage. A monitoring signal 122 includes a torsional loading signal indicative of a torsional loading operating characteristic of a gear, a bearing, or other equipment such as in driveline 36. Speeds and/or speed ranges may also be monitored for these or other components. A monitoring signal 124 includes a load cycle signal indicative of a number of load cycles operating characteristic of cylinder or actuator 26. A load cycle signal as contemplated herein could also be indicative of a number of load cycles of an electrical contactor, or still other equipment. A monitoring signal 126 includes a runtime signal. Runtime signal 126 may track a runtime, associated with machine 10, in an example an on-time of an HVAC system or an alternator. In another implementation a tracked runtime could represent an elapsed time that machine 10 is traveling, a time that electric power device 66 is supplying electric power, a time that electric traction motor 64 is operating or still another parameter.

As discussed herein the types of operating characteristics that might be monitored can vary widely. In an implementation, each of the operating characteristics may include but is not limited to a cycle number characteristic, a temperature characteristic, a thermal loading characteristic, a mechanical or structural loading characteristic, an energy characteristic, or a chemical degradation characteristic. Each of the stored SOH degradation progression profiles may be based on at least one of, a cycle number criterion, a fatigue criterion, a thermal loading criterion, an energy criterion, or a chemical degradation criterion. This means that in practice the SOH of any given component can be determined on the basis of the present state and/or a history of the associated operating characteristic, and the corresponding SOH degradation progression profile being populated with at least one of the listed criteria.

FIG. 3 further shows calculation of an SOH term via calculation module 128 for each one of the plurality of components utilizing a stored SOH degradation profile. Numeral 130 shows a stored stress fatigue profile. In an embodiment the stress fatigue profile could include or be based on an S-N curve. For instance, by monitoring structural loading experienced by frame 12, the stored stress fatigue profile can enable a determination of historical frame stress relative to the S-N curve and thus a determination of the SOH of frame 12. In this context, the stored stress fatigue profile can be understood as a structural fatigue model. Numeral 132 shows a thermal fatigue SOH degradation progression profile. An SOH term for electric traction motor 64 could be determined based on an S-N thermal fatigue curve, for example. In this context the stored thermal fatigue profile can be understood as a thermal fatigue model. Numeral 134 shows a battery degradation model, such that an SOH term for electric power device/battery 66 is calculated on the basis of a stored battery degradation model. Numeral 136 shows a cycle count degradation progression profile. An SOH term for resistor grid 34 could be calculated on the basis of a counted number of thermal cycles. Numeral 138 shows a throughput count degradation progression profile for calculating an SOH for brake 28. A throughput count could include a total energy throughput of brake 28, an energy throughput over time, a counted number of energy throughput cycles above a threshold, or still another parameter. Numeral 140 shows a torque, speed equation degradation profile for calculating an SOH term for a gear, a bearing, a shaft, or another component. Numeral 142 shows an event detection/count for calculating an SOH term for a hydraulic cylinder, an electrical contactor, or another component. Numeral 144 shows time accumulation, with a runtime associated with machine 10 being tracked on the basis of operating time of machine 10 or a component of machine 10 as discussed herein.

Upon calculation of each of the plurality of the SOH terms via calculation module 128, a plurality of SOH reporting signals 150 are outputted to service scheduling module 152 as discussed herein, each reporting signal 150 being based on a respective one of the SOH terms for one of the plurality of components. Service interval scheduling module 152 generates component predictions for displaying to a user and/or taking action upon, such as hours to service or state-of-health at a block 154. Service interval scheduling module 152 may also generate a recommended service, such as hours to service of specific components, at a block 156. Example implementations of service interval scheduling are further discussed herein.

FIG. 3 also shows component SOH service targets at a block 146 and inputted as configuration settings 148 to system controller 40. A user or supervisory controller may input component SOH service targets, such as number of cycles permitted or recommended between service intervals, number of hours permitted or recommended between service intervals, a cumulative damage threshold, or still other parameters.

Figure 4:
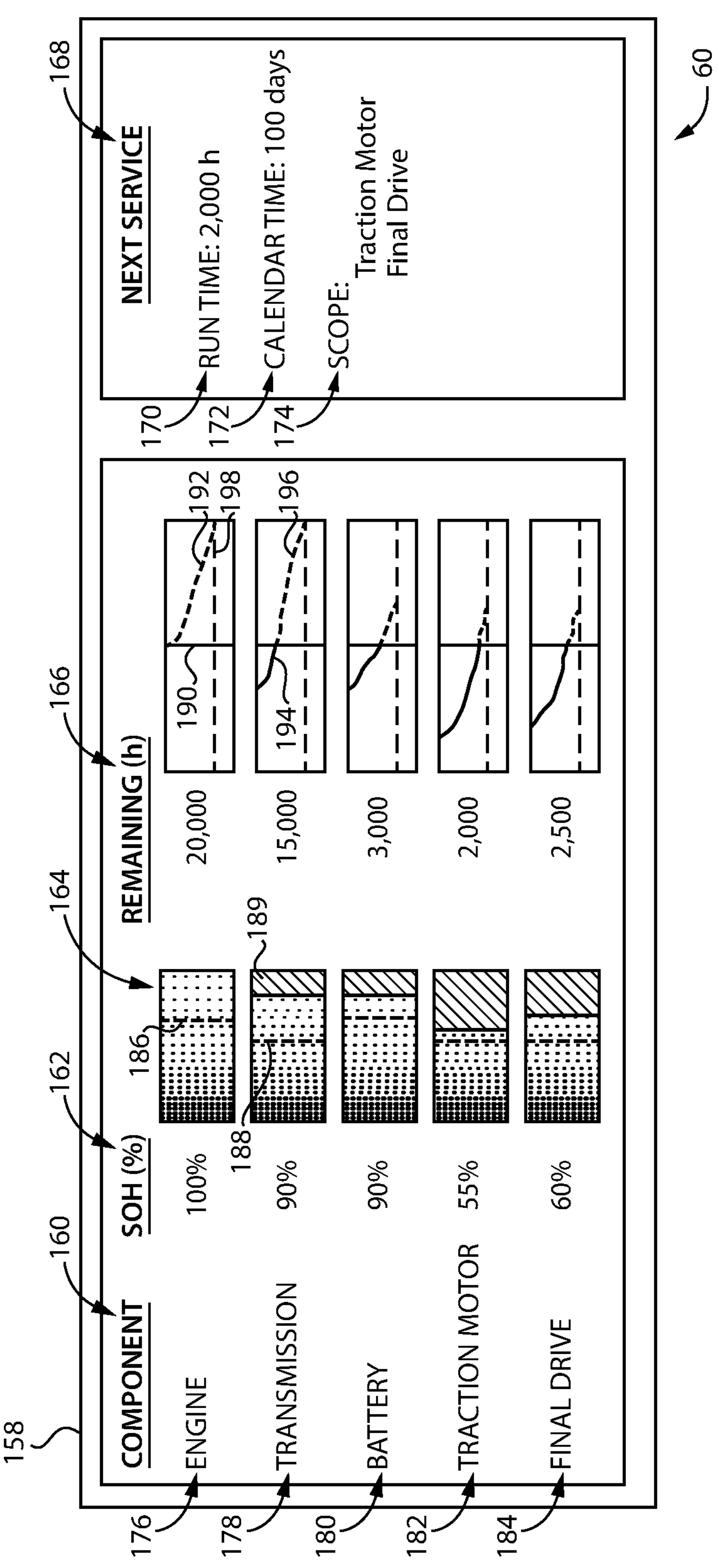
FIG. 4 is a diagrammatic view of an example display used in state of health monitoring and service interval scheduling, according to one embodiment.

Focusing now on FIG. 4, there is shown an example display 158 as it might appear on service computer 60, or any other onboard or offboard computer, presenting information to a user. Display 158 shows at numeral 160 a list of components monitored, including in the illustrated example an engine 176, a transmission 178, a battery 180, a traction motor 182, and a final drive 184. At 162 display 158 shows an SOH % corresponding to each of the listed components. At 164 display 158 shows a graphical representation of SOH for each of the listed components. At 166 display 158 shows a remaining time in hours for each of the listed components. At 168 display 158 shows Next Service information, including Run Time at 170 and Calendar Time at 172. Scope of Service is shown at 174 and lists the traction motor and the final drive.

The plurality of SOH reporting signals may be indicative of a plurality of different continued service capacities among the plurality of components. Produced on display 158 is a representation of the plurality of different continued service capacities. In particular, at 162 it can be seen the engine SOH % is equal to 100%. In the graphic corresponding to engine SOH under numeral 164 a dashed 186 shows an estimated target for service, such as replacement or rebuild. The next graph below under 164 corresponds to the transmission SOH % equal to 90%. A dashed line 188 shows approximately a target for service, such as replacement or rebuild. Numeral 189 shows a portion of the graphic representing health or service life consumed. The remaining graphics corresponding to the battery, traction motor, and final drive all illustrate differing service targets and differing health or service life consumed.

With regard to the remaining hours information displayed at 166 it can be noted that each graphic corresponds generally left-to-right to the components listed at 166. A solid vertical line, 190 in the graphic corresponding to the engine, represents a present time. To the left of the solid vertical line is shown historical SOH, representing in each respective case a reduction in SOH over time. To the right of the respective solid vertical line is shown a predicted future SOH reduction, 192 in the case of the engine, and 196 in the case of the transmission. A dashed horizontal line, 198 in the case of the engine, represents an SOH level at which service is required or recommended.

In the illustration of FIG. 4 the engine is new or nearly new, or recently returned to service. Thus no prior SOH information is displayed. The transmission is at 90%, and thus prior SOH information is shown at 194 preceding present time, as well as a prognostic SOH trend at 196. It can be noted the various components show different SOH histories, as well as different SOH projections going forward. It will thus be appreciated that the display of information enables a user, or potentially a computer with or without actually displaying information, to judge appropriate times for service that take account of historical patterns of SOH for multiple components as well as future SOH predictions. In the case of Next Service displayed at 168, it will be recalled service is scheduled at a run time of 2000 more hours or a calendar time of 100 days. The scheduling of service, triggered in response to a service scheduling signal determined on a computer or inputted by a user, has been chosen so as to bundle servicing of the traction motor approximately at its end of service life with servicing of the final drive some time before the end of its service life. In this example, it may be considered advantageous to service the final drive when the traction motor is removed from the machine, avoiding a return for servicing not long after to service the final drive. Other examples could include a multiplicity of other combinations of components scheduled for service at any given time, guided at least in part by information displayed or otherwise utilized as in the example of FIG. 4.

The present disclosure thus contemplates providing a user information of the SOH as indicated by SOH reporting signals for each of the plurality of components, such that the user can take action to schedule servicing on the basis of the SOH of each of the plurality of components. As noted, in some implementations, a supervisory controller, or system controller 40 itself, could interpret the SOH reporting signals and schedule or recommend service without interaction of a human user at all.

It will be recalled the present disclosure is not limited to electric-drive systems. It has nevertheless been observed in electric-drive systems that the electric traction motor(s) and batteries can diverge in SOH over time, due at least in part to differing usage, differing severity of usage, and other factors. For example, at least some of the time during machine operation a battery will be discharging to supply electric power to the electric traction motor while the motor operates to propel the machine. At other times, such as during regenerative charging, the motor may be operating while the battery is charging. In still other instances the battery may be charging while the machine is stationary and the motor not operated at all. The battery may be charged in some cases while the machine is performing productive work, such as during regenerative charging while the machine is hauling material while traveling down a grade. Temperature control systems for the battery and the motor may also operate differently from one another based on what the machine is doing and when. In different load modes, one component may be sensitive to coolant temperature and power while another component is sensitive to torque and speed. Short and long term production plan changes may also affect cycle severity progression.

As such, the progression of degradation to the SOH of different components in an electric drive system may be widely divergent, and in view of this divergence the present disclosure can assist in optimizing service interval scheduling. Analogous differential usage profiles and divergent SOH amongst still other components in an electric-drive or other type of machine may also be observed. For these and other reasons engineers have encountered obstacles to designing certain machines and machine systems for servicing at consistent and predictable service intervals. One or more components in a machine according to the present disclosure may also be understood to be associated with an operating characteristic that is runtime-independent of a runtime associated with the machine. For example, as explained above battery SOH may be runtime-independent of electric traction motor runtime. Devices used in battery temperature control might not be runtime-independent of a runtime of the battery itself, but runtime-independent of the electric traction motor. Still other examples will be apparent to those skilled in the art in view of the present disclosure.

INDUSTRIAL APPLICABILITY

Figure 5:
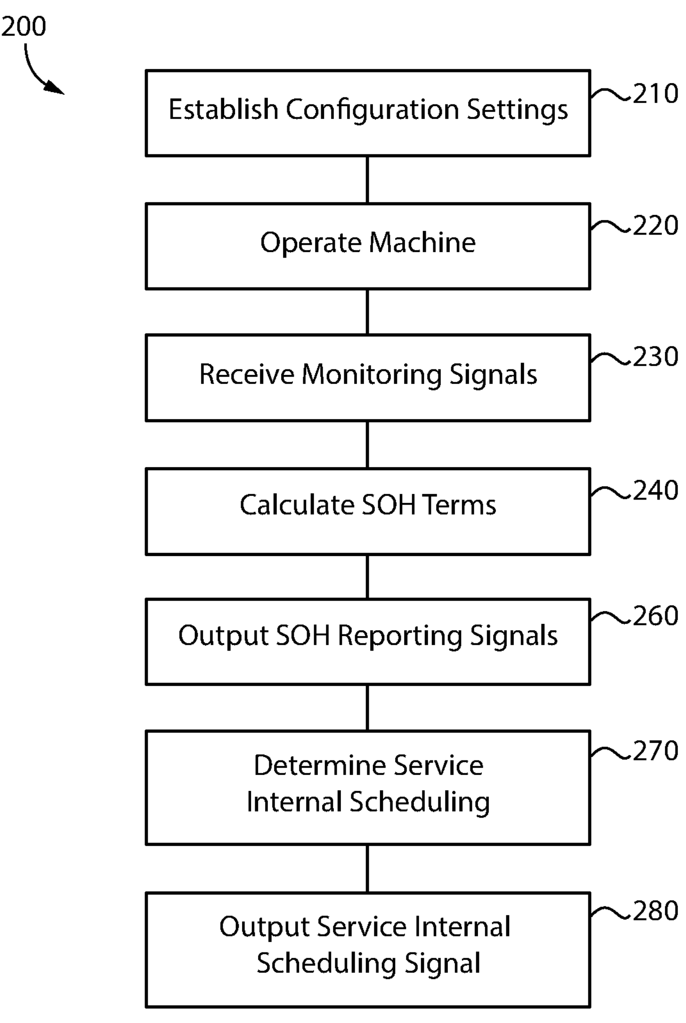
FIG. 5 is a flowchart illustrating example methodology and logic flow, according to one embodiment.

Referring to the drawings generally, but also now to FIG. 5, there is shown a flowchart 200 illustrating example methodology and logic flow, according to one embodiment. At a block 210 configuration settings are established and inputted to system controller 40. Configuration settings could include criteria including factory default criteria for populating the plurality of stored SOH degradation progression profiles, including a cycle number criterion, a fatigue criterion, a thermal loading criterion, an energy criterion, a chemical degradation criterion, and potentially many others. Users may configure SOH levels for replacement of components, varied from a factory default level, by increasing or decreasing the SOH level for replacement. For example, individual components might have a default SOH level or setting for service from the manufacturer, but a user might increase or decrease the SOH level to trigger service to optimize service life with respect to performance and/or for use in grouping component service recommendations.

At a block 220 machine 10 is operated, including operating electric-drive system 20 to travel and maneuver machine 10, as well as operating various of the other components of machine 10. At a block 230, a plurality of monitoring signals, for a plurality of components in machine 10 are received, each being indicative of an operating characteristic upon which an SOH of a respective one of the plurality of components is dependent.

At a block 240 SOH terms for each one of the plurality of components are calculated based on the plurality of monitoring signals and the plurality of stored SOH degradation progression profiles. At a block 260 SOH reporting signals each based on a respective one of the SOH terms are outputted.

At a block 270 service interval scheduling is determined. It will be recalled that service interval scheduling might take place by the actions of a human user, or operation of an electronic control unit. Service interval scheduling may include recommending or establishing a timing of servicing of certain components, potentially bundling servicing of multiple components for purposes of efficiency. In one example, servicing of both non-electric components and electric components in a drivetrain might be synched based on an imminent need to service only one of those components. At a block 280 a service interval scheduling signal is outputted, based on at least one of the SOH reporting signals, providing a recommended service timing that can be displayed to a user or acted upon by a controller. The service interval scheduling signal may be indicative of a scheduled service timing, such as operating hours to be performed or a calendar date, that is based on two or more of the different continued service capacities among the plurality of components.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating a machine comprising:

operating a plurality of components including at least one power device in a drive system coupled to ground-engaging elements in a machine;

receiving a plurality of monitoring signals for the plurality of components from a plurality of sensors on the machine, and each being indicative of an operating characteristic upon which a state-of-health (SOH) of a respective one of the plurality of components is dependent;

calculating an SOH term for each one of the plurality of components based on the plurality of monitoring signals;

outputting a plurality of SOH reporting signals each based on a respective one of the SOH terms; and generating via a computerized system controller a different prognostic SOH degradation progression representation, in comparison to a respective service target, for each one of the plurality of components, based on the plurality of SOH reporting signals, and a plurality of different stored SOH degradation profiles, for the plurality of components, populated at least in part when the plurality of components respectively begin service or are returned to service in the machine.

2. The method of claim 1 wherein the at least one power device includes an electric power device coupled to an electric traction motor in the drive system.

3. The method of claim 2 wherein the calculating an SOH term includes calculating an SOH term for the electric power device based on a stored chemical degradation model, and calculating an SOH term for the electric traction motor based on a stored thermal fatigue model.

4. The method of claim 1 further comprising determining a plurality of different continued service capacities among the plurality of components based on the plurality of SOH reporting signals.

5. The method of claim 4 further comprising displaying the plurality of different continued service capacities on a display.

6. The method of claim 4 wherein the determining the plurality of different continued service capacities includes determining a present SOH and a predicted future SOH for each of the plurality of components.

7. The method of claim 1 wherein each of the operating characteristics includes a cycle number characteristic, a temperature characteristic, a thermal loading characteristic, a mechanical loading characteristic, an energy characteristic, or a chemical degradation characteristic.

8. The method of claim 1 wherein the outputting a plurality of SOH reporting signals includes outputting the plurality of SOH reporting signals from a calculation module to a service interval scheduling module, and further comprising scheduling service for at least one of the plurality of components based on the plurality of SOH reporting signals.

9. The method of claim 8 wherein the scheduling service for at least one of the plurality of components includes scheduling a service timing for a plurality of the components having different continued service capacities.

10. A machine comprising:

a plurality of components including at least one power device in a drive system of the machine;

a service interval scheduling system including a plurality of sensors, and a system controller structured to:

receive, at least in part from one or more of the plurality of sensors, a plurality of monitoring signals each being indicative of an operating characteristic upon which a state of health (SOH) of a respective one of the plurality of components is dependent;

calculate an SOH term for each one of the plurality of components based on the plurality of monitoring signals;

output a plurality of SOH reporting signals each based on a respective one of the SOH terms and indicative of a continued service capacity of the respective one of the plurality of components;

generate via the system controller a representation of a predicted future SOH trend for each respective one of the plurality of components in comparison to a respective component service target, based on the plurality of SOH reporting signals, and a plurality of stored SOH degradation profiles, for the plurality of components, populated at least in part when the plurality of components respectively begin service or are returned to service in the machine; and determine a service timing for at least some of the plurality of the components based on the representations of the predicted future SOH trend for each respective one of the plurality of components.

11. The machine of claim 10 wherein the power device includes an electric power device, and the plurality of components further includes an electric traction motor in the drive system of the machine.

12. The machine of claim 11 wherein the operating characteristic upon which the SOH of the electric traction motor is dependent includes a thermal loading operating characteristic, and the system controller is further structured to calculate the SOH term for the electric traction motor based on a stored thermal fatigue model.

13. The machine of claim 11 wherein the operating characteristic upon which the SOH of the electric power device is dependent includes a chemical degradation operating characteristic, and the system controller is further structured to calculate the SOH term for the electric power device based on a stored chemical degradation model.

14. The machine of claim 11 wherein the SOH of the electric power device and the electric traction motor are divergent with respect to runtime.

15. The machine of claim 10 further comprising a display, and the system controller is further structured to produce on the display a graphical representation of a present SOH and the predicted future SOH for each one of the plurality of components.

16. A system for service interval scheduling in a machine comprising:

a computerized system controller structured to:

receive via a state-of-health (SOH) monitoring module a plurality of monitoring signals each being indicative of an operating characteristic upon which an SOH of a respective one of a plurality of components in a machine is dependent;

calculate an SOH term for each one of the plurality of components based on the plurality of monitoring signals, and a plurality of different stored SOH degradation profiles, for the plurality of components, populated at least in part when the plurality of components respectively begin service or are returned to service in the machine;

output to a service interval scheduling module a plurality of SOH reporting signals each based on a respective one of the SOH terms and being indicative of a plurality of different continued service capacities among the plurality of components; and generate a representation of a predicted future SOH trend for each respective one of the plurality of components in comparison to a respective component service target.

17. The system of claim 16 further comprising a display, and the system controller is further structured to produce on the display a graphical representation of the plurality of different continued service capacities.

* * * * *